United States Patent [19]

O'Connor et al.

[11] 4,233,205
[45] Nov. 11, 1980

[54] MODIFIED POLYURETHANE LIQUID POLYMER COMPOSITIONS

[75] Inventors: James M. O'Connor, Clinton; Willie J. Sessions, New Haven, both of Conn.

[73] Assignee: Olin Corporation, New Haven, Conn.

[21] Appl. No.: 23,870

[22] Filed: Mar. 26, 1979

[51] Int. Cl.³ .................. C08G 18/32; C08K 3/36
[52] U.S. Cl. .................. 260/40 TN; 260/37 N; 526/211; 528/50; 528/60
[58] Field of Search ............ 260/37 N, 859 R, 407 N; 526/211; 528/60, 50

[56] References Cited

U.S. PATENT DOCUMENTS

| | | | |
|---|---|---|---|
| 3,225,007 | 12/1965 | Gruber et al. | 525/440 |
| 3,694,241 | 9/1972 | Guthrie et al. | 427/288 |
| 3,697,395 | 10/1972 | Kehr et al. | 260/858 X |
| 3,907,751 | 9/1975 | Knight et al. | 260/859 R X |
| 3,976,553 | 8/1976 | Larsen | 204/159.22 |
| 3,980,595 | 9/1976 | Schonfeld et al. | 260/3 |
| 3,981,901 | 9/1976 | Guthrie et al. | 560/115 |
| 4,045,317 | 8/1977 | Larsen | 204/159.23 |
| 4,045,516 | 8/1977 | Morgan | 260/859 R X |
| 4,156,677 | 5/1979 | Williams et al. | 260/37 N X |

OTHER PUBLICATIONS

Strecker, "Vulcanization of Liquid Polydienes with Dithiols and Peroxides", *Rubber Chem. & Tech.*, pp. 675–689.

Sheard, "Commercial Status of Liquid Elastomers," *Chemtech*, May 1973, pp. 298–303.

*Primary Examiner*—Sandra M. Person
*Attorney, Agent, or Firm*—Gordon F. Sieckmann; Donald F. Clements

[57] ABSTRACT

A novel, heat curable, liquid polymer composition is disclosed which comprises a modified urethane oligomer containing ethylenic unsaturation, a free radical catalyst, a polyfunctional mercaptan, and a filler.

26 Claims, No Drawings

MODIFIED POLYURETHANE LIQUID POLYMER COMPOSITIONS

Synthetic rubber materials have been broadly developed in recent decades. The vulcanization of internally unsaturated polydienes, such as polybutadiene and polyisoprene, has been extensively investigated. It is now well known that cure of such internally unsaturated polymers may be effected by reaction with polythiols (e.g., U.S. Pat. No. 2,964,502). However, these polymers have been shown not to be entirely satisfactory. Even after curing, the polymeric products retain residual internal unsaturation which causes them to be unstable to oxidation. Gradual oxidative degradation results in embrittlement of the polymer and attendant product breakdown.

Liquid synthetic rubber systems, such as polyurethane systems, also are known in the art. Such systems exhibit practical drawbacks in that commercially available liquid polyurethane prepolymers are isocyanate terminated, and these terminal —NCO groups are extremely unstable in storage. Isocyanate groups readily react with traces of moisture in the atmosphere to form gaseous carbon dioxide and viscous urea extended products. It further has been found that cast articles formed from polyurethanes tend to melt and become slippery under high shear conditions. This tendency limits their utilization in various applications.

It has now been discovered, according to the present invention, that a heat curable liquid polymer composition can be prepared comprising a modified urethane oligomer containing terminal ethylenic unsaturation, a polyfunctional mercaptan monomer, and a free radical catalyst. Such a composition features the advantages of a one-component storage stable system that requires only heat for activation. The low oligomer viscosity accommodates utility with standard processing equipment and allows for relatively easy incorporation of large amounts of filler to achieve desirable polymer properties. The cured polymer compositions exhibit properties which make them suitable for a wide variety of utilities including door and window moldings, solid tires and wheels, and other flexible mechanical parts.

Various modified polyurethane elastomers previously have been disclosed. For example, in U.S. Pat. No. 3,980,595 to Schonfeld et al, a polyurethane composition is described containing a substantial proportion of a nonfunctional hydrocarbon rubber, such as polybutadiene, polyisoprene, styrene/butadiene copolymers and the like. A curing agent for the urethane and a separate and distinct curing agent for the hydrocarbon rubber are included. Another approach is described in U.S. Pat. No. 3,981,901 which teaches that a urethane polythiol can be reacted with polyenes in the presence of a photocuring rate accelerator to form polymers. The urethane polythiols are prepared by the reaction of a hydroxy polythiol and an organic isocyanate. U.S. Pat. No. 3,697,395 to Kehr et al discloses a photocurable liquid polymer composition which includes a liquid polyene component with terminal unsaturated carbon-to-carbon bonds, a polythiol component, and a photocuring rate accelerator.

None of these prior art systems, however, offers a heat curable, storage-stable liquid polyol which produces a polymer product featuring the physical properties of the modified polyurethane oligomer composition of the present invention.

The polyurethane oligomer that is utilized according to the invention is prepared by first reacting an organic diisocyanate with a polyol using standard procedures, to yield an isocyanate-terminated prepolymer of controlled molecular weight having a free NCO range of about 0.1% to about 30%. Preferably, the prepolymer has a free NCO range of about 0.5% to about 10%. Common urethane catalysts, e.g., tertiary amines and metal compounds such as stannous octoate or dibutyltin dilaurate may be used to accelerate the reaction. In forming the prepolymer, chain extenders, well known to those in the polyurethane art, also may be included in the reaction mixture. These chain extenders include low molecular weight glycols such as ethylene glycol, butane diol, propylene glycol, bisphenol A, and the like.

The aliphatic polyol reactant used in the prepolymer formation is selected from aliphatic polyether polyols and aliphatic polyester polyols. The polyol can be any such compound or may be mixtures of two or more such compounds. The polyol, or mixture of polyols, should have an average equivalent weight ranging from about 300 to about 4,000. Preferably, the average equivalent weight is about 1,000 to about 3,000. The average functionality of the polyol or polyol blend preferably is about 2 to about 3.

The polyester polyols include the products of reacting polycarboxylic acids with polyhydric alcohols. Illustrative polycarboxylic acids include, for example, oxalic, malonic, succinic, glutaric, adipic, pimelic, suberic, azelaic acid, and the like. Illustrative polyhydric alcohols include various diols, triols, tetrols and higher functionality alcohols, such as ethylene glycol, 1,3-propylene glycol, 1,2-propylene glycol, butylene glycols, butane diols, pentane diols, glycerol, trimethylolpropane, trimethylolhexane, pentaerythritol, sorbitol, hexane 1,2,6-triol, 2-methyl glucoside, mixtures thereof and the like.

Polyether polyols are the preferred polyol reactant. Suitable polyether polyols include various polyoxyalkylene polyols and mixtures thereof. These can be prepared, according to well-known methods, by condensing an alkylene oxide, or a mixture of alkylene oxides using random or step-wise addition, with a polyhydric initiator or mixture of initiators. Illustrative alkylene oxides include ethylene oxide, propylene oxide, butylene oxide, amylene oxide, aralkylene oxides such as styrene oxide, and the halogenated alkylene oxides such as trichlorobutylene oxide and so forth. The most preferred alkylene oxide is propylene oxide or a mixture thereof with ethylene oxide using random or step-wise oxyalkylation.

The polyhydric initiators using in preparing the polyether polyol reactant includes (a) aliphatic diols such as ethylene glycol, 1,3-propylene glycol, 1,2-propylene glycol, butylene glycols, butane diols, pentene diols, and the like, (b) the aliphatic triols such as glycerol, trimethylolpropane, triethylolpropane, trimethylolhexane, and the like, (c) higher functionality alcohols such as sorbitol, pentaerythritol, methyl glucoside, and the like, (d) the polyamines such as tetraethylene diamine and (e) the alkanolamines such as diethanolamine, triethanolamine and the like.

A preferred group of polyhydric initiators for use in preparing the polyether polyol reactant is one which comprises aliphatic diols and triols such as ethylene glycol, propylene glycol, glycerol, trimethylolpropane and the like.

The alkylene oxide-polyhydric initiator condensation reaction is preferably carried out in the presence of a catalyst such as KOH as is well known in the art. In effecting the reaction, a sufficient proportion of alkylene oxide is used as to provide a final polyol product having an average equivalent weight of about 300 to about 4,000, preferably about 1,000 to about 3,000, and more preferably about 2,000. The catalyst is thereafter preferably removed, leaving a polyether polyol which is ready for use in preparing the isocyanate-terminated prepolymer of the invention.

The organic diisocyanates used in the polyurethane prepolymer formation include toluene diisocyanate, such as the 80:20 or the 65:35 isomer mixture of the 2,4- and 2,6-isomeric forms, ethylene diisocyanate, propylene diisocyanate, methylenebis-(4-phenyl isocyanate), xylene diisocyanate, 3,3'-bitoluene-4,4'-diisocyanate, hexamethylene diisocyanate, naphthalene 1,5-diisocyanate, the polymeric isocyanates such as polyphenylene polymethylene isocyanate, and the like, and mixtures thereof. Toluene diisocyanate is preferred.

To form the polyurethane oligomer that is utilized according to the invention, the prepared isocyanate-terminated prepolymer, as defined above, is then reacted with an isocyanate reactive group-containing unsaturated monomer, using methods well known in the art, to result in a final free NCO of from 0 to about 20 percent, preferably about 0 to about 10 percent, and most preferably about 0 to about 5 percent. Suitable reactive group-containing unsaturated monomers are selected from the group consisting of unsaturated acrylates and unsaturated amides such as hydroxyethyl acrylate, hydroxypropyl acrylate, hydroxyethyl methacrylate, hydroxyethyl acrylamide, t-butylaminoethyl methacrylate, N-(isobutoxymethyl)acrylamide, and the like. By reaction of the isocyanate-terminated prepolymer with the unsaturated monomer, a controlled molecular weight urethane oligomer with terminal reactive unsaturation is produced.

Alternatively, unsaturation may be incorporated into the urethane oligomer by esterification or transesterification of the base polyols with maleic anhydride, other unsaturated anhydrides, acrylates, methacrylates, or any suitable unsaturated polyol acid or ester.

Another alternative route to impart mercaptan functionality, as well as ethylenic unsaturation into the urethane oligomer, is to react an excess of a polyfunctional mercaptan and an isocyanate reactive group containing unsaturated monomer with the free isocyanate-containing prepolymer to result in an oligomer featuring both terminal unsaturation and mercaptan functionality.

The polyfunctional mercaptan utilized as the extending and crosslinking agent in the invented compositions has a functionality of at least 2 and may be used alone or in combination with other polyfunctional mercaptans. Suitable mercaptans include trimethylolpropane trithioglycolate, trimethylolpropane tri(3-mercaptopropionate), glycol dimercaptopropionate, glycol dimercaptoacetate, pentaerythritol tetra(3-mercaptopropionate), pentaerythritol tetrathioglycolate, dipentaerythritol hexa(3-mercaptopropionate), and the like. The mercaptan or mixture of mercaptans are mixed with the unsaturated urethane oligomers at a level ranging from about 0.5 to about 5 times the number of equivalents of ethylenic unsaturation. Preferably, the mercaptan is used at a level ranging from about 0.8 to about 1.2 times the equivalents of unsaturation.

The modified urethane oligomer liquid polymer system is polymerized and cured in the presence of a heat activated, free radical generating catalyst. The actual curing temperature is dependent on the particular catalyst employed. Suitable free radical catalysts include peroxide or azo type compounds, known to those in the art. Typical peroxide catalysts are illustrated by organo peroxides and hydroperoxides such as benzoyl peroxide, dicumyl peroxide, methyl ethyl ketone peroxide, lauryl peroxide, cyclohexanone peroxide, t-butyl perbenzoate, t-butyl hydroperoxide, t-butylbenzene hydroperoxide, cumene hydroperoxide, t-butyl peroctoate and the like. Typical azo compounds are azobisisobutyronitrile, 2-t-butylazo-2-cyano-4-methylpentane, and 4-t-butylazo-4-cyano-valeric acid. The preferred catalysts are peroxide catalysts. In particular, preferred peroxide catalysts are t-butyl peroctoate, t-butyl perbenzoate, and mixtures thereof. The catalyst generally is used in an amount from about 0.1 to about 10 parts by weight per 100 parts by weight of the oligomer.

Preferably, the composition also contain fine particulate reinforcement filler material. These fillers include finely divided materials such as carbon black, silica, calcium silicate, calcium carbonate, clay, alumina, zinc oxide, barytes, whiting, magnesium carbonate, talc, glass microspheres, and the like. Fibrous materials such as fiberglass, carbon fibers, asbestos fibers, and the like also can be used. Precipitated silica has been found to be particularly preferred. From about 10 to about 100 parts by weight of filler per 100 parts by weight of the urethane oligomer generally is used. About 25 to about 50 parts by weight of filler material is preferred.

The presently invented composition also may contain other standard ingredients, if desired, such as plasticizers, viscosity modifiers, mold release agents, lubricants, accelerators, and anti-oxidants. Other additive ingredients may include pigments, flame retardants, surfactants, and various additives familiar to those skilled in the liquid rubber technology. To lower the viscosity of the urethane oligomer in order to accommodate easier incorporation of filler or other additives, copolymerizable vinyl monomers may also be added. Such materials include acrylate and methacrylate monomers, such as hexanediol diacrylate, ethylene dimethacrylate, and the like, as well as styrene and other styrene-type monomers. These additional vinylic materials can be added in an amount ranging from 0 to about 25% by weight of the oligomer, preferably 0 to about 10% by weight.

The following examples are provided to further illustrate the invention. All parts and percentages are by weight unless otherwise specified.

EXAMPLES 1-39

The hereinbelow outlined general procedure was followed in the preparation of modified polyurethane liquid polymer composition according to the present invention. The specific formulations are set forth in Table I below.

The polyol(s) first was heated to 100° C. and degassed at 0.2 torr pressure for a period of one hour. After cooling to 60° C., the required amount of diisocyanate was added to the polyol, along with the butane diol chain extender, and the reaction mixture was stirred at 80° C. for two hours and then allowed to cool to 60° C. At this time, the hydroxyethyl acrylate isocyanate reactive group containing monomer was added along with 20 ppm of stannous octoate catalyst. The reaction was allowed to exotherm and then was heated at 80° C. for two hours.

Test panels were prepared from these modified polyurethane oligomer compositions using the following general procedure. The specific formulations are set forth in Table I below.

Into a high shear mixing device was added the polyurethane oligomer and polyfunctional mercaptan, into which the peroxide catalyst was also blended. Gradually, the particulate filler was added and worked in until the mix appeared reasonably homogeneous. At this stage, reinforcing materials, such as glass or Aramid fiber, also were added, in addition to, or in place of the filler. Next, the dough-like blend was worked on a two roll rubber mill to more uniformly disperse the filler throughout the mix. Then, to effect cure, the total mix was placed in a mold at 325° F. for five minutes under pressure. Table II below lists the physical properties of the cured test panels prepared in Examples 1 to 39.

TABLE II

| Shore A Hardness | Tensile Strength (psi) | 100% Modulus (psi) | Elongation At Break % | Tear (ppi) | Comments |
|---|---|---|---|---|---|
| 86 | 716 | — | 83 | 133 | |
| 80 | 1,211 | 474 | 300 | 189 | |
| 83 | 1,027 | 1,027 | 140 | 143 | |
| 82 | 1,014 | 574 | 190 | 168 | |
| 91 | 1,312 | 841 | 180 | 178 | |
| 88 | 1,645 | 751 | 253 | 226 | |
| 66 | 1,952 | 139 | 693 | 199 | |
| 77 | 1,164 | 442 | 303 | 160 | |
| 67 | 1,310 | 235 | 513 | 149 | |
| 79 | 1,232 | 402 | 343 | 180 | |
| 74 | 2,568 | 201 | 675 | 140 | |
| 85 | 1,192 | 813 | 153 | 180 | |
| 94 | 1,735 | 1,067 | 157 | 220 | |
| 80 | 1,228 | 427 | 313 | 175 | |
| 73 | 1,967 | 206 | 717 | 233 | |
| 84 | 2,045 | 382 | 466 | 178 | |
| 83 | 906 | 629 | 150 | 141 | |

TABLE I

Polyurethane Liquid Polymer Composition[1]

| Example | Polyols (eq.) A[2] | Polyols (eq.) B[3] | Chain Extenders[5] (eq.) | Unsaturated Monomer[6] (eq.) | Diisocyanate[7] (eq.) | Mercaptan[8] (eq.) | Oligomer Viscosity cps @ 50° C. | Filler[9] pts./100 pt. Oligomer |
|---|---|---|---|---|---|---|---|---|
| 1 | 1.0 | 0 | 1.83 | 2.67 | 5.50 | 2.94 | 14,000 | 37.5 |
| 2 | 1.0 | 0.75 | 0 | 1.17 | 2.92 | 1.29 | 16,000 | 37.5 |
| 3 | 1.0 | 0 | 2.83 | 2.0 | 5.83 | 2.2 | 100,000+ | 25.0 |
| 4 | 0 | 1.0 | 1.0 | 1.47 | 3.47 | 1.62 | 5,000 | 37.5 |
| 5 | 1.0 | 0.92 | 0.92 | 2.67 | 5.51 | 2.94 | 4,000 | 50.0 |
| 6 | 1.0 | 0.375 | 0.375 | 1.17 | 2.92 | 1.29 | 4,000 | 50.0 |
| 7 | 1.0 | 3.83 | 0 | 1.33 | 6.16 | 1.46 | 71,000 | 37.5 |
| 8 | 1.0 | 1.83 | 0 | 2.67 | 5.50 | 2.94 | 6,000 | 37.5 |
| 9 | 0 | 1.0 | 1.0 | 0.80 | 2.8 | 0.88 | 3,000 | 25.0 |
| 10 | 1.0 | 0.625 | 0.625 | 0.83 | 3.08 | 0.91 | 100,000+ | 37.5 |
| 11 | 0 | 1.0 | 1.0 | 0.39 | 2.39 | 0.43 | 100,000+ | 37.5 |
| 12 | 1.0 | 0.125 | 1.25 | 1.50 | 2.75 | 1.65 | 3,000 | 37.5 |
| 13 | 1.0 | 0 | 2.83 | 2.0 | 5.83 | 2.2 | 100,000+ | 50.0 |
| 14 | 1.0 | 1.42 | 1.42 | 2.0 | 5.84 | 2.2 | 12,000 | 37.5 |
| 15 | 0 | 1.0 | 0 | 0.40 | 1.40 | 0.44 | 17,000 | 37.5 |
| 16 | 1.0 | 1.92 | 1.92 | 1.33 | 6.17 | 1.46 | 100,000+ | 50.0 |
| 17 | 1.0 | 0 | 0.75 | 1.17 | 2.92 | 1.29 | 12,000 | 37.5 |
| 18 | 1.0 | 2.83 | 0 | 2.0 | 5.83 | 2.2 | 16,000 | 25.0 |
| 19 | 0 | 1.0 | 4.0 | 2.0 | 7.0 | 2.2 | 100,000+ | 37.5 |
| 20 | 1.0 | 1.42 | 1.42 | 2.0 | 5.84 | 2.2 | 12,000 | 37.5 |
| 21 | 1.0 | 0.375 | 0.375 | 1.17 | 2.87 | 1.29 | 4,000 | 25.0 |
| 22 | 0 | 1.0 | 1.0 | 0.80 | 2.80 | 0.88 | 3,000 | 50.0 |
| 23 | 1.0 | 0 | 3.83 | 1.33 | 6.16 | 1.46 | 100,000+ | 37.5 |
| 24 | 1.0 | 0.92 | 0.92 | 2.67 | 5.51 | 2.94 | 4,000 | 25.0 |
| 25 | 1.0 | 1.92 | 1.92 | 1.33 | 6.17 | 1.46 | 100,000+ | 25.0 |
| 26 | 1.0 | 2.83 | 0 | 2.0 | 5.83 | 2.2 | 16,000 | 50.0 |
| 27 | 1.0 | 1.42 | 1.42 | 2.0 | 5.84 | 2.2 | 12,000 | 37.5 |
| 28 | 0 | 1.0 | 0 | 1.67 | 2.67 | 1.84 | | 37.5 |
| 29 | 0 | 1.0 | 0 | 2.0 | 3.00 | 2.20 | | 37.5 |
| 30 | 0 | 1.0 | 0 | 0.6 | 1.60 | 0.66 | | 37.5 |
| 31 | 1.0 | 0.75 | 0 | 1.17 | 2.92 | 1.29 | | 15[10] |
| 32 | 1.0 | 0.75 | 0 | 1.17 | 2.92 | 1.29 | | 25[10] |
| 33 | 0 | 1.0 | 1.0 | 1.67 | 2.67 | 1.84 | | 90 |
| 34 | 0 | 1.0 | 1.0 | 0.39 | 2.39 | 0.43 | | 100 |
| 35 | 1.0 | 0.5 | 0.5 | 1.2 | 3.2 | 1.32 | | 30 |
| 36 | 1.0 | 0.5 | 0.5 | 1.2 | 3.2 | 1.32 | | 30 |
| 37 | 0 | 1.0[4] | 3.7 | 2.3 | 7.0 | 2.53 | | 0 |
| 38 | 0 | 1.0[4] | 3.7 | 2.3 | 7.0 | 2.53 | | 37.5 |
| 39 | 0 | 1.0[4] | 1.0 | 0.41 | 2.48 | 0.45 | | 65.0[11] |

[1]All formulations contained, in addition to the listed ingredients, 0.7 pts. t-butyl perbenzoate and 0.7 pts. (50/50) t-butyl peroctoate/dicotyl phthalate per 100 gms. of oligomer and monomer.
[2]Polyol A is a polyether triol having a molecular weight of about 4500 and was prepared by end capping a propoxylated glycerol precursor with ethylene oxide to a final hydroxyl number of about 36.
[3]Polyol B is a polyether diol having a molecular weight of about 3000 and was prepared by end capping a propoxylated dipropylene glycol precursor with ethylene oxide to a final hydroxyl number of about 37.
[4]Polyol B was substituted with a polyether diol having a molecular weight of about 4000 prepared by end capping a propoxylated dipropylene glycol precursor with ethylene oxide to a final hydroxyl number of about 28.
[5]1,4-Butane diol.
[6]Hydroxyethyl acrylate.
[7]A mixture of toluene diisocyanate isomers (80/20 mixture of 2,4/2,6-isomers).
[8]Trimethylolpropane tri(2-mercaptopropionate).
[9]Particulate silica obtained under the trademark "CAB-O-SIL" from Cabot Corporation.
[10]In place of silica, Aramid fiber obtained from DuPont under the trademark "KEVLAR" was used.
[11]The filler consisted of 50 parts of "CAB-O-SIL" and 50 parts of ¼" chopped fiberglass.

TABLE II-continued

| Shore A Hardness | Tensile Strength (psi) | 100% Modulus (psi) | Elongation At Break % | Tear (ppi) | Comments |
|---|---|---|---|---|---|
| 66 | 905 | 300 | 340 | 140 | |
| 89 | 1,753 | 985 | 186 | 206 | |
| 80 | 932 | 457 | 235 | 176 | |
| 78 | 607 | | 75 | 98 | |
| 80 | 1,656 | 384 | 488 | 271 | |
| 90 | 1,981 | 963 | 228 | 291 | |
| 75 | 511 | 388 | 142 | 134 | |
| 65 | 678 | 217 | 340 | 156 | |
| 80 | 1,954 | 335 | 535 | 248 | |
| 76 | 1,498 | 417 | 352 | 198 | |
| 79 | 900 | | 235 | 133 | |
| 84 | 1,082 | | 247 | 139 | |
| 74 | 850 | | 898 | 128 | |
| 87 | 1,305 | | 30 | 495 | |
| 90 | 1,413 | | 30 | 382 | |
| 90+ | 1,464 | 14,802(12) | 167 | — | |
| 90+ | 620 | 16,694(12) | 160 | — | Poor Dispersion of Filler. |
| | 804 | | 113 | 109.8 | Filler Dispersed with Mixer. |
| | 934 | | 150 | 110 | Filler Dispersed with Mixer and Mill Passed. |
| | 400 | | 70 | | Soft. |
| | 1,714 | | 300 | 238.5 | Fairly Stiff but Flexible. |
| 88 | 1,116 | 9,435(12) | 468 | 315 | |

(12) Room temperature flex modulus rather than 100% modulus values.

What is claimed is:

1. A polyurethane liquid polymer composition comprising a urethane oligomer, a polyfunctional mercaptan monomer, a heat activated free radical generating catalyst, and a filler, said urethane oligomer having a final free NCO content from 0 to about 20 percent and being prepared by reacting
   (a) an isocyanate-terminated prepolymer having a final free NCO content ranging from about 0.1 to about 30 percent which is the product of reacting
      (1) an organic diisocyanate with
      (2) an aliphatic polyol having
         (i) an average equivalent weight of about 300 to about 4,000,
         (ii) an average functionality of about 2 to about 3, and
         (iii) said aliphatic polyol is selected from the group consisting of aliphatic polyether polyols, aliphatic polyester polyols and mixtures thereof, with
   (b) an isocyanate reactive group-containing unsaturated monomer selected from the group consisting of
      (1) unsaturated acrylates and
      (2) unsaturated amides.

2. The composition of claim 1 wherein said heat activated free radical generating catalyst is a peroxide catalyst.

3. The composition of claim 2 wherein said peroxide catalyst is selected from t-butyl perbenzoate, t-butyl peroctoate, and mixtures thereof.

4. The composition of claim 1 wherein said filler is added in an amount ranging from about 10 to about 100 parts by weight per 100 parts by weight of said urethane oligomer.

5. The composition of claim 4 wherein said filler is added in an amount ranging from about 25 to about 50 parts by weight.

6. The composition of claim 5 wherein said filler is a finely divided precipitated silica.

7. The composition of claim 1 wherein said isocyanate-terminated prepolymer has a final free NCO content ranging from about 0.1 to about 30 percent, and said urethane oligomer has a final free NCO content ranging from about 0 to about 10 percent.

8. The composition of claim 7 wherein said isocyanate-terminated prepolymer has a final free NCO content ranging from about 0.5 to about 10 percent, and said urethane oligomer has a final free NCO content ranging from about 0 to about 5 percent.

9. The composition of claim 1 wherein said isocyanate-terminated prepolymer is the product of reacting an organic diisocyanate with an aliphatic polyether polyol.

10. The composition of claim 9 wherein said aliphatic polyether polyol has an average equivalent weight of about 1,000 to about 3,000.

11. The composition of claim 10 wherein said aliphatic polyether polyol is prepared by reacting a polyhydric initiator selected from aliphatic diols and aliphatic triols with an alkylene oxide selected from propylene oxide and mixtures of propylene oxide with ethylene oxide.

12. The composition of claim 1 wherein said isocyanate-terminated prepolymer is the product of reacting an organic diisocyanate with an aliphatic polyester polyol.

13. The composition of claim 12 wherein said aliphatic polyester polyol is prepared by reacting a polyhydric initiator selected from aliphatic diols and aliphatic triols with a polycarboxylic acid.

14. The composition of claim 1 wherein said isocyanate-terminated prepolymer further comprises a chain extending agent.

15. The composition of claim 14 wherein said chain extending agent is ethylene glycol.

16. The composition of claim 14 wherein said chain extending agent is butane diol.

17. The composition of claim 14 wherein said chain extending agent is propylene glycol.

18. The composition of claim 14 wherein said chain extending agent is bisphenol A.

19. The composition of claim 1 wherein said isocyanate-terminated prepolymer is prepared by employing toluene diisocyanate as said organic diisocyanate.

20. The composition of claim 1 wherein
   (a) about 25 to about 50 parts by weight of said filler are employed,
   (b) said urethane oligomer has a final free NCO content of from 0 to about 5 percent,
   (c) said isocyanate-terminated prepolymer has a final free NCO content ranging from about 0.5 to about 10 percent, and
   (d) said unsaturated monomer is hydroxyethyl acrylate.

21. A process for preparing a vulcanized polyurethane polymer product comprising mixing a urethane oligomer, a polyfunctional mercaptan monomer, a heat activated free radical generating catalyst, and a filler to a homogeneous blend, and then heating said mixture at a temperature adequate to activate said catalyst and cure said mixture, said urethane oligomer having a final free NCO content from 0 to about 20 percent and being prepared by reacting (a) an isocyanate-terminated prepolymer having a final free NCO content ranging from about 0.1 to about 30 percent which is the product of reacting
  (1) an organic diisocyanate with
  (2) an aliphatic polyol having
    (i) an average equivalent weight of about 300 to about 4,000,
    (ii) an average functionality of about 2 to about 3, and
    (iii) said aliphatic polyol is selected from the group consisting of aliphatic polyether polyols, aliphatic polyester polyols and mixtures thereof, with
(b) an isocyanate reactive group-containing unsaturated monomer selected from the group consisting of
  (1) unsaturated acrylates and
  (2) unsaturated amides.

22. The process of claim 21 wherein said aliphatic polyol has an average equivalent weight of about 1,000 to about 3,000,
  said isocyanate-terminated prepolymer has a final free NCO content ranging from about 0.5 to about 10 percent, and
  said urethane oligomer has a final free NCO content of from 0 to about 5 percent.

23. The process of claim 21 wherein said isocyanate-terminated prepolymer further comprises a chain extending agent.

24. The vulcanized polyurethane polymer product prepared according to the process of claim 21.

25. The vulcanized polyurethane polymer product prepared according to the process of claim 22.

26. The vulcanized polyurethane polymer product prepared according to the process of claim 23.

* * * * *